US012654491B2

(12) United States Patent
Ong

(10) Patent No.: US 12,654,491 B2
(45) Date of Patent: Jun. 16, 2026

(54) DRIVE SOCKET PROTECTOR FOR LUG NUTS AND WHEELS

(71) Applicant: AHO Holdings LLC, Zeeland, MI (US)

(72) Inventor: Andrew Ong, Zeeland, MI (US)

(73) Assignee: AHO Holdings LLC, Zeeland, MI (US)

( * ) Notice: Subject to any disclaimer, the term of this patent is extended or adjusted under 35 U.S.C. 154(b) by 397 days.

(21) Appl. No.: 18/260,168

(22) PCT Filed: Dec. 23, 2021

(86) PCT No.: PCT/US2021/065066

§ 371 (c)(1),
(2) Date: Jun. 30, 2023

(87) PCT Pub. No.: WO2022/146871

PCT Pub. Date: Jul. 7, 2022

(65) Prior Publication Data

US 2024/0066920 A1 Feb. 29, 2024

Related U.S. Application Data

(60) Provisional application No. 63/132,807, filed on Dec. 31, 2020.

(51) Int. Cl.
B60B 29/00 (2006.01)
B25B 13/06 (2006.01)
(52) U.S. Cl.
CPC ............ B60B 29/003 (2013.01); B25B 13/06 (2013.01)

(58) Field of Classification Search
CPC ..... B25B 13/06; B25B 13/065; B60B 29/001; B60B 29/003
See application file for complete search history.

(56) References Cited

U.S. PATENT DOCUMENTS 3,433,108 A 3/1969 Ondeck
3,930,428 A * 1/1976 Hale .................... B25B 13/485
411/910

(Continued)

FOREIGN PATENT DOCUMENTS

CN 110405672 A 11/2019
DE 202013102488 U1 6/2013

(Continued)

OTHER PUBLICATIONS

International Search Report and Written Opinion for PCT/US2021/065066, dated Apr. 8, 2022, 8 pp.

*Primary Examiner* — David B. Thomas

(74) *Attorney, Agent, or Firm* — Bodman PLC

(57) ABSTRACT

The drive socket protector for wheels and lug nuts includes a flexible sheath shaped to define an elongated receptacle having a tubular wall extending from an enclosed end to an open end. The elongated receptacle includes an interior volume configured to receive a socket tool. The socket tool has a lug opening disposed at the enclosed end of the elongated receptacle. The elongated receptacle further includes an exterior surface at the enclosed end that is configured to interface with a lug nut. The tubular wall is flexible and is configured to conform into the lug opening of the socket tool to be disposed between the lug nut and the socket tool when the socket tool is contained within the interior volume of the elongated receptacle.

20 Claims, 15 Drawing Sheets

(56) References Cited

U.S. PATENT DOCUMENTS

| | | | | |
|---|---|---|---|---|
| 4,649,620 A * | 3/1987 | Omori | B25B 23/00 | 29/520 |
| 4,979,355 A | 12/1990 | Ulevich | | |
| 5,009,133 A * | 4/1991 | Carey | B25B 13/06 | 81/180.1 |
| 5,123,308 A * | 6/1992 | Shaffer | B25B 13/488 | 81/56 |
| 5,528,964 A * | 6/1996 | Smith, Jr. | B60B 29/005 | 81/177.2 |
| 5,595,251 A * | 1/1997 | Cook, Jr. | B23P 19/069 | 74/411 |
| 5,692,420 A * | 12/1997 | Byers | B25B 19/00 | 81/463 |
| 5,797,300 A * | 8/1998 | Fairbanks | B25B 23/16 | 81/177.8 |
| 5,797,659 A * | 8/1998 | Fuller | F16B 23/0038 | 301/35.623 |
| 5,896,792 A * | 4/1999 | Hurt | B25B 23/0035 | 81/125 |
| 5,921,157 A * | 7/1999 | Smith | B25B 13/461 | 81/177.5 |
| 6,006,634 A * | 12/1999 | Byers | B25G 1/043 | 81/177.2 |
| 6,240,809 B1 * | 6/2001 | Sasarak | B25G 1/005 | 81/58 |
| 6,298,543 B1 * | 10/2001 | Shore | B21J 15/36 | 72/478 |
| 6,321,623 B1 * | 11/2001 | Dykes | B25B 13/065 | 411/402 |
| 7,082,864 B1 * | 8/2006 | Weber | B25B 13/56 | 81/492 |
| 7,243,577 B1 * | 7/2007 | Morris | B25B 13/463 | 81/177.5 |
| 7,252,022 B1 * | 8/2007 | Losee | B25B 13/102 | 81/124.5 |
| 8,205,529 B1 | 6/2012 | Laurie | | |
| 9,138,876 B2 * | 9/2015 | Cullison | B25B 17/02 | |
| 10,274,001 B2 * | 4/2019 | Lambert | B60B 29/005 | |
| 10,703,136 B2 * | 7/2020 | Phillips | B25B 23/0035 | |
| 10,780,738 B2 * | 9/2020 | Bowden, Sr. | B25G 1/043 | |
| 11,872,842 B2 * | 1/2024 | Kumpfmüller | B60B 29/00 | |
| 2005/0022631 A1 | 2/2005 | Brazil | | |
| 2006/0117915 A1 | 6/2006 | Hui | | |
| 2006/0266166 A1 | 11/2006 | Weber | | |
| 2014/0053692 A1 * | 2/2014 | Hu | B25B 13/06 | 81/121.1 |
| 2018/0170100 A1 * | 6/2018 | Hardison | B60B 29/007 | |

FOREIGN PATENT DOCUMENTS

| | | | |
|---|---|---|---|
| JP | H0639360 U | 5/1994 | |
| WO | 2016145491 A1 | 9/2016 | |

* cited by examiner

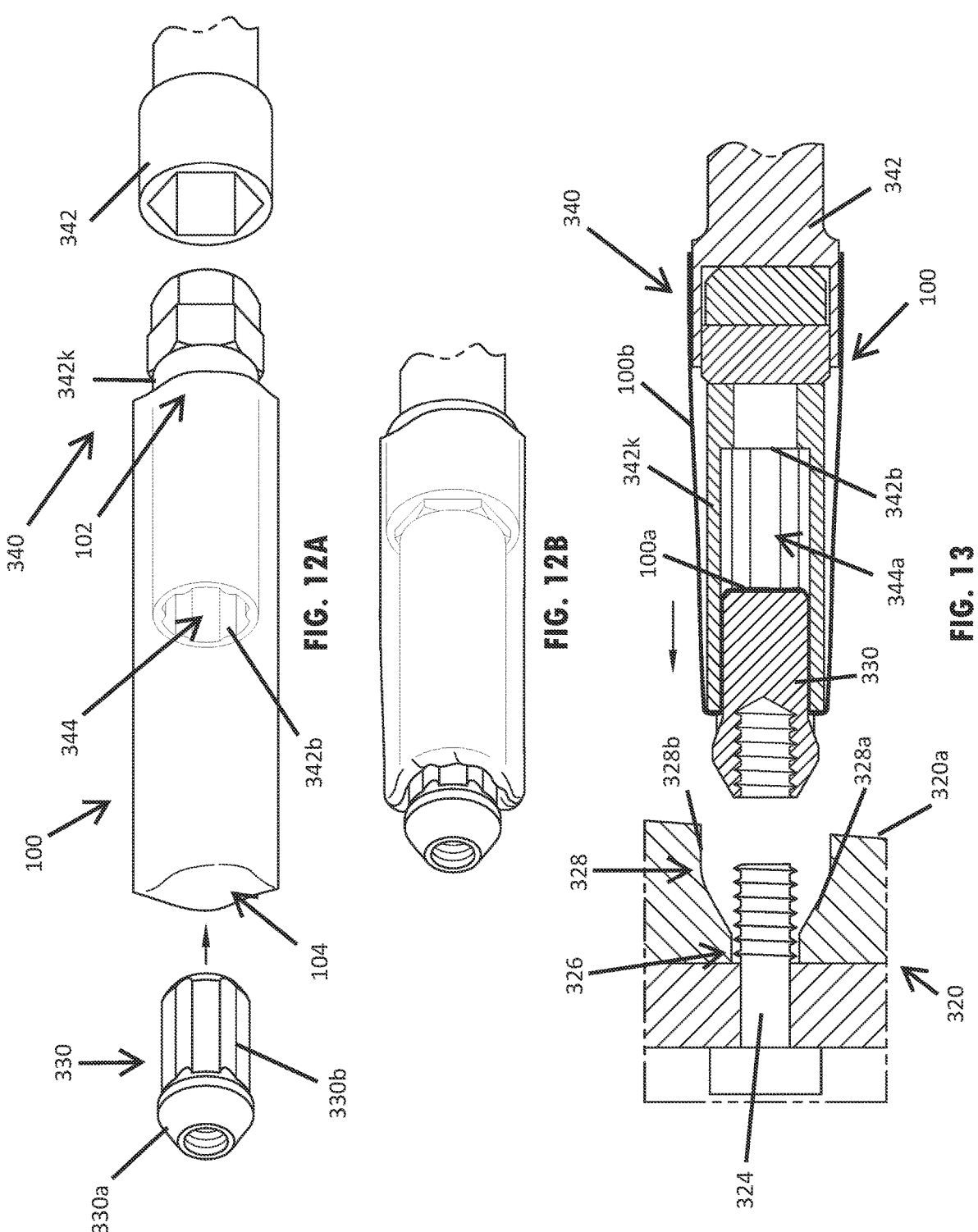

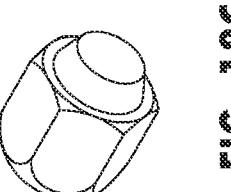
FIG. 18C
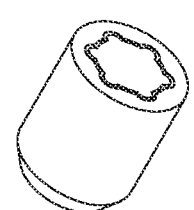
FIG. 18F
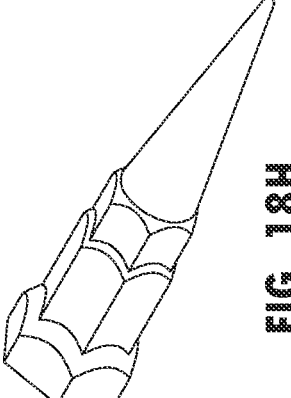
FIG. 18H
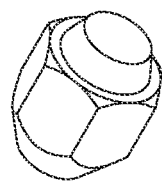
FIG. 18B
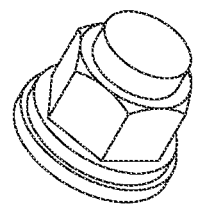
FIG. 18E
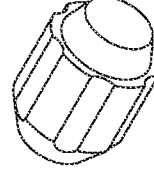
FIG. 18G
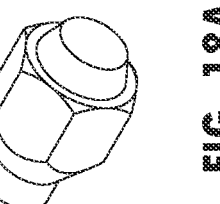
FIG. 18A
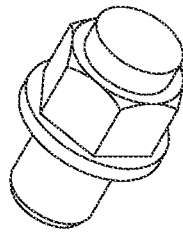
FIG. 18D

DRIVE SOCKET PROTECTOR FOR LUG NUTS AND WHEELS

CROSS-REFERENCE TO RELATED APPLICATION

This application is a National Phase Application filed under 35 U.S.C. § 371 as a national stage of PCT/US2021/065066, filed on Dec. 23, 2021, an application claiming the benefit and priority under 35 U.S.C. § 119(e) to U.S. Provisional Patent Application No. 63/132,807, filed Dec. 31, 2020, the disclosure of each is considered part of this application and is hereby incorporated by reference in its entirety.

TECHNICAL FIELD

The present disclosure relates to lug nuts and socket tools used to retain a wheel at a vehicle, and more specifically to a drive socket protector for preventing damage to lug nuts and wheels during installation and/or removal of lug nuts.

BACKGROUND

Vehicle wheels, such as those used on passenger cars, trucks, motorcycles, busses and the like, are often affixed to an axle via a wheel hub, where the wheel hub presents a number of bolts arrayed in a circular pattern. The wheel, commonly a rubber tire wrapped around a steel or aluminum rim assembly, will have a number of bolt holes arrayed in a circular pattern to correspond to the bolts at the wheel hub. Upon installation, the bolts will be placed through their corresponding bolt holes and lug nuts will be used to tighten the wheel to the wheel hub, such that the wheel may rotate about a corresponding axle, drive shaft, or the like.

Commonly, vehicle wheels also provide aesthetic value to the vehicle. Wheels may have a powder-coated, paint-coated, chrome-plated, or other attractive finish. Lug nuts often match or enhance the aesthetic qualities of their corresponding wheels with similar type finishes. These finishes, however, are often susceptible to scratching, chipping, and other surface and structural damages caused by environmental factors (such as street curbs, gravel, and sticks) and often the installation or removal of lug nuts from the wheel. When wheels are removed from a vehicle (for tire changes, tire rotations, brake maintenance, etc.), the lug nuts are often removed using a common socket tool such as a lug wrench, socket wrench, or impact wrench. These tools often cause damage to the aesthetic finish of the lug nuts and wheels. It is desirable to prevent such damage to ensure the aesthetic and structural integrity of both the lug nuts and wheels.

SUMMARY

The present disclosure provides a drive socket protector for wheels and lug nuts and a corresponding method for using a drive socket protector with a lug nut of a wheel. The drive socket protector includes a flexible sheath that receives a socket tool in the interior volume. The flexible sheath is sufficiently flexible and pliable, such as a thin polymer film material, so that the encased socket tool can interface with a lug nut with the flexible sheath disposed between the opposing surfaces of the socket tool and the lug nut. When engaged with a lug nut, the drive socket protector also extends back over the socket tool to interfaces with the lug opening of a wheel. The drive socket protector provides simultaneous and enhanced protection to both lug nuts and lug openings of a wheel when mounting or removing a wheel from a vehicle.

According to one aspect of the present disclosure, the drive socket protector for wheels and lug nuts includes a flexible sheath shaped to define an elongated receptacle having a tubular wall extending from an enclosed end to an open end. The elongated receptacle includes an interior volume configured to receive a socket tool. The socket tool has a lug opening disposed at the enclosed end of the elongated receptacle. The elongated receptacle further includes an exterior surface at the enclosed end that is configured to interface with a lug nut. The tubular wall is flexible and is configured to conform into the lug opening of the socket tool to be disposed between the lug nut and the socket tool when the socket tool is contained within the interior volume of the elongated receptacle.

Implementations of the disclosure may include one or more of the following optional features. In some implementations, the socket tool may be a socket that is engaged by a ratchet or an impact wrench. The socket tool may also include a lug nut key that engages the socket, where the ratchet or the impact wrench engage and drive the socket.

Additionally, with a lug nut conforming the flexible sheath into the lug opening, the tubular wall may be configured to wrap around an edge of the socket tool and extend proximally along an exterior surface of the socket tool. The dimensions of the flexible sheath may be configured to protect both the lug nut and a lug hole of a wheel, as well as correspond to the diameter of a socket tool. The flexible sheath may be formed form a polymer film having a thickness less than 0.1 mm.

Furthermore, the drive socket protector may have a drawstring, which may be a cord disposed at the tubular wall configured to compass an outer ring of the elongated receptacle, that conforms the open end to the socket tool. The exterior surface of the drive socket protector at the enclosed end may be removably attached to an open end of an additional drive socket protector, providing a serrated edge for detaching the two protectors thereat.

According to another aspect, a method is provided for using a drive socket protector with a lug nut of a wheel. The method involves inserting a socket tool having a lug opening through an open end of a drive socket protector. The open end is defined by a rim of a tubular wall that spans between the open end an enclosed end formed by a meeting of the tubular wall. The tubular wall further defines an interior volume, such that the lug opening is disposed in the interior volume at the enclosed end and configured to engage an interior surface of the tubular wall at the enclosed end. A lug nut is engaged with an exterior surface of the enclosed end, such that the interior surface of the tubular wall substantially conforms to an interior surface of the lug opening. The tubular wall extends proximally along an exterior surface of the socket tool, so as to provide a barrier between the socket tool and a lug hole of the wheel. The lug nut is disposed at a wheel and a rotational force is applied at the socket tool so as to tighten or loosen the lug nut at the wheel.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

FIG. 12A is an exploded perspective view of a drive socket protector on a lug nut key with a lug nut corresponding to the lug nut key and a socket tool receiving the lug nut key;

FIG. 12B is a perspective view of the drive socket protector and devices of FIG. 12A;

FIGS. 13-15 are cross-sectional views of a drive socket protector in use on a socket tool and lug nut key during different stages of installing a lug nut corresponding to the lug nut key at a wheel;

FIGS. 18A-18H are perspective views of various embodiments of lug nuts compatible with a drive socket protector.

Like reference symbols in the various drawings indicate like elements.

DETAILED DESCRIPTION

Figure 1A:
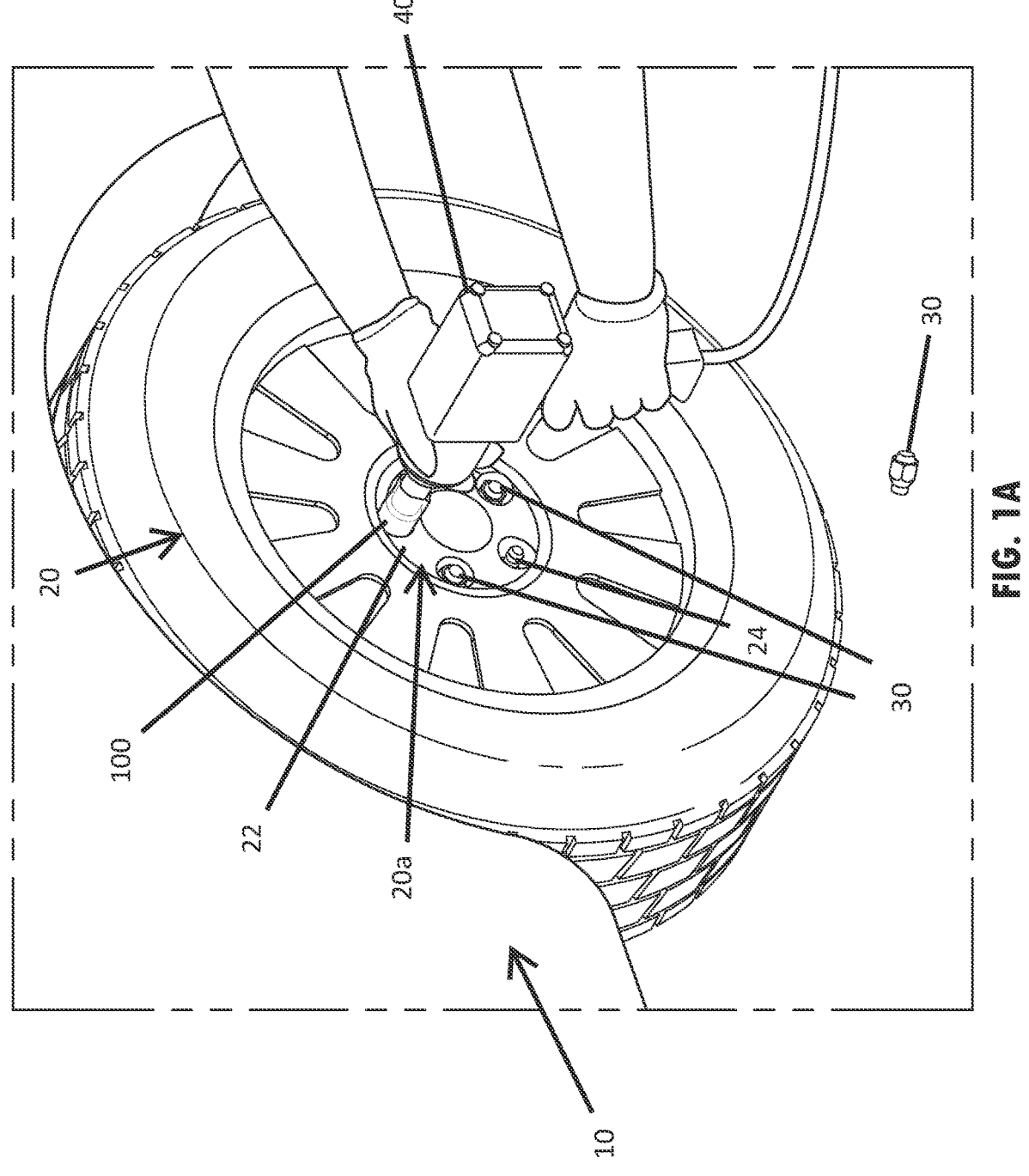
FIGS. 1A-1C are environmental views of a drive socket protector in use on different socket tools with different varieties of lug nuts.

The methods and devices described herein relate to lug nuts and socket tools used to retain a wheel at a wheel hub or similar component on a vehicle, such as a passenger car, truck, motorcycle, bus, tractor, or the like. A drive socket protector for lug nuts and wheels is used to prevent damage at the wheel and lug nut during installation and/or removal of the lug nut by providing a barrier or cover for the tool acting on the lug nut. While this application may frequently reference the example of a lug nut being attached at a wheel of a vehicle, it should be understood that the present disclosure relates to bolts and other attaching hardware as well as other applications in which it is desirable to prevent direct contact between a tool and the fastener on which it is acting and structure surrounding the fastener.

Wheels commonly used by the vehicles listed above typically comprise a center portion or disk configured to engage the wheel hub, an outer rim or barrel configured to retain a rubber tire, and a wheel body or spoke assembly radiating outward from the center portion to the barrel. The wheel hub enables rotation of the wheel about the axle, drive shaft, or the like and provides a number of bolts protruding from the wheel hub in a circular array at which the center portion of the wheel is received. The wheel provides a corresponding circular array of holes at the center portion for receiving the bolts from the wheel hub (at a bolt hole portion) and receiving lug nuts engaged to the ends of the bolts (at a lug hole portion). The holes may be formed through a thickness of the wheel at the center portion, such as at equal spacing about the disk shaped portion of the center portion.

When installed on a vehicle, an inward facing portion of the center portion or disk sits flush against the wheel hub so that the bolts extending from the wheel hub pass through the holes of the wheel and are exposed at an outward facing side of the wheel, generally at the center portion or disk. Lug nuts, having a thread configured to receive the bolts, are then installed at each of the bolts and tightened to retain the wheel at the wheel hub. The lug nuts have a body with a greater diameter than an inner portion (e.g., the bolt hole portion) of the corresponding hole, such as a collar that forms a seat for the lug nut. As the lug nuts engage the bolt, they will engage the wheel and apply a clamping force at the wheel and maintaining the wheel at the wheel hub. Specifically, the lug nuts engage around the inner portion or seat of the hole, such as at an outward facing surface of the center disk surrounding the bolt hole portion.

In each hole, the bolt hole portion (also referred to as the bolt hole) is disposed at an inner portion of the wheel and corresponds to lug hole portion (also referred to as the lug hole) on an outward facing side of the center portion or disk. The holes may be bored from an outward facing side of the wheel, but the largest diameter (i.e., the lug hole portion) does not pass through the entire thickness of the wheel. Rather, the lug hole portion frequently represent bores through an irregular or outer surface of the wheel to present a regular or uniform or matching surface at which the lug nut interfaces with the wheel. The lug hole portion may comprise a number of different configurations, but generally present a uniform seat upon which the lug nut sits. For example, a lug hole portion may present a rounded seat configured to engage a ball-seat lug nut, a tapered seat configured to engage an acorn-seat lug nut, or flat seat configured to engage a flat-seat lug nut. Providing a uniform contact surface at each lug nut is desirable for achieving a uniform torque or clamping force across the many lug nuts, thereby preventing a wobble or uneven rotation of the wheel. At high revolutions, over time, a wobble or uneven rotation of the wheel can lead to uneven wear of the tires, tie rods, and brakes, warping of the wheel hub, broken lug nuts, or other undesirable results.

Sometimes during installation, the lug nut or wheel may be scratched or scuffed or chipped or otherwise marred by the traditional tools used in removing and installing lug nuts (such as lug wrenches, socket wrenches, and impact wrenches). The surfaces of wheels and lug nuts often have an ornamental finish or coating applied to enhance the aesthetic qualities of the vehicle. For example, a surface may be powder-coated, paint-coated, chrome-plated, or polished. These surfaces, however, may be susceptible to scratching or chipping when the hard surface of a lug-attaching tool comes into contact. This damage most commonly occurs in four regions: the lug hole seat, the lug hole wall, the top surface of the lug nut, and the side surfaces of the lug nut. While scratches and like damage primarily affect the aesthetic qualities of the wheel and lug nut, some more severe damages such as chipping may affect a lug nuts ability to provide a consistent clamping force at the wheel. Additionally, because both aesthetic and structural damages to the wheel and lug nuts are undesirable and may cause safety concerns in their own right, they may also lead to a vehicle owner installing replacement wheels or lug nuts not originally intended for the vehicle, providing additional potential for a decline in safety, durability of related parts, or even monetary value of the vehicle attributed to having factory installed parts original to the vehicle. Thus, while lug nuts and wheels may be replaced, it remains highly desirable to maintain lug nuts and wheels in an unblemished state for at least the reasons discussed above.

Figure 1B:
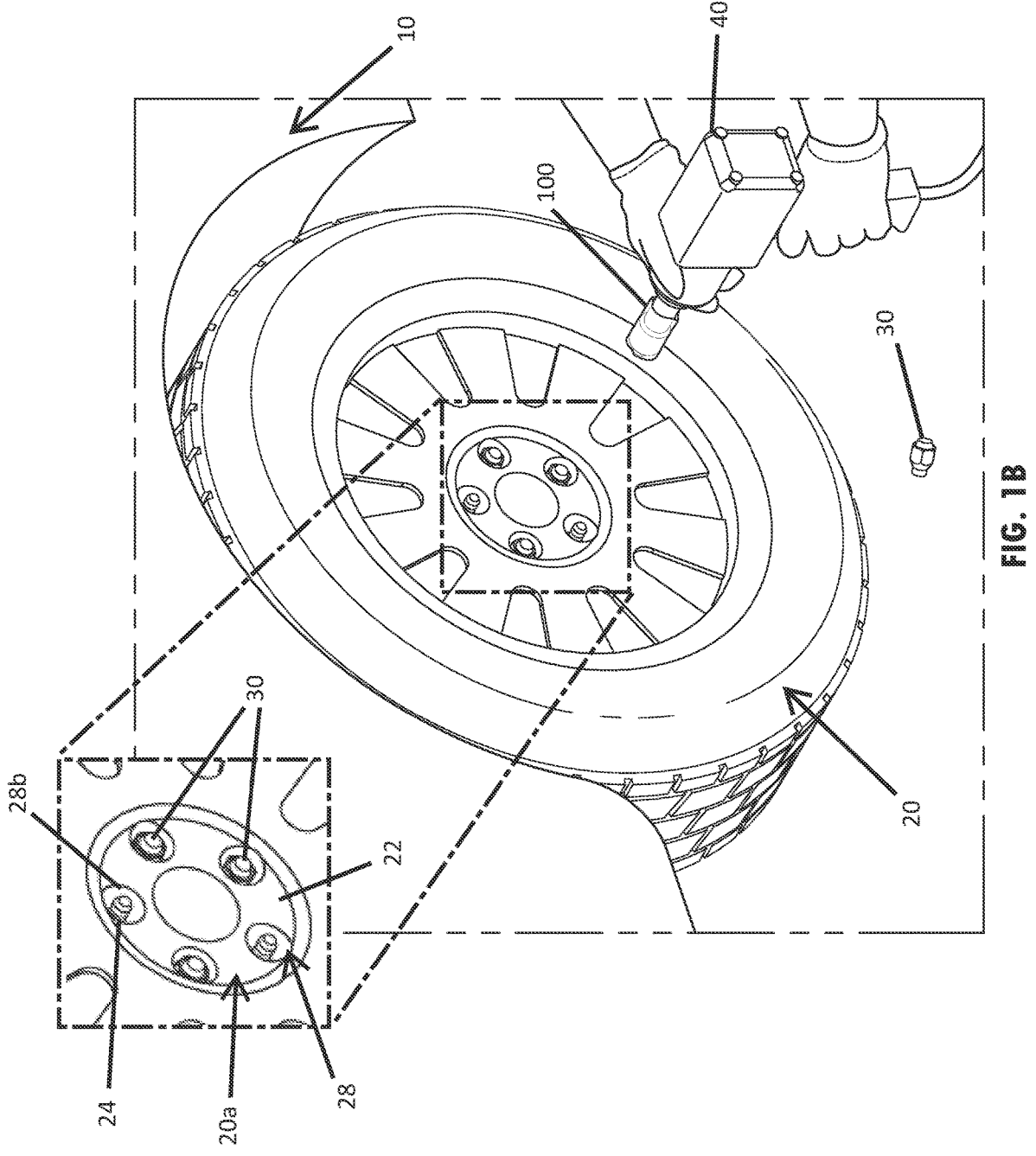
Figure 1C:
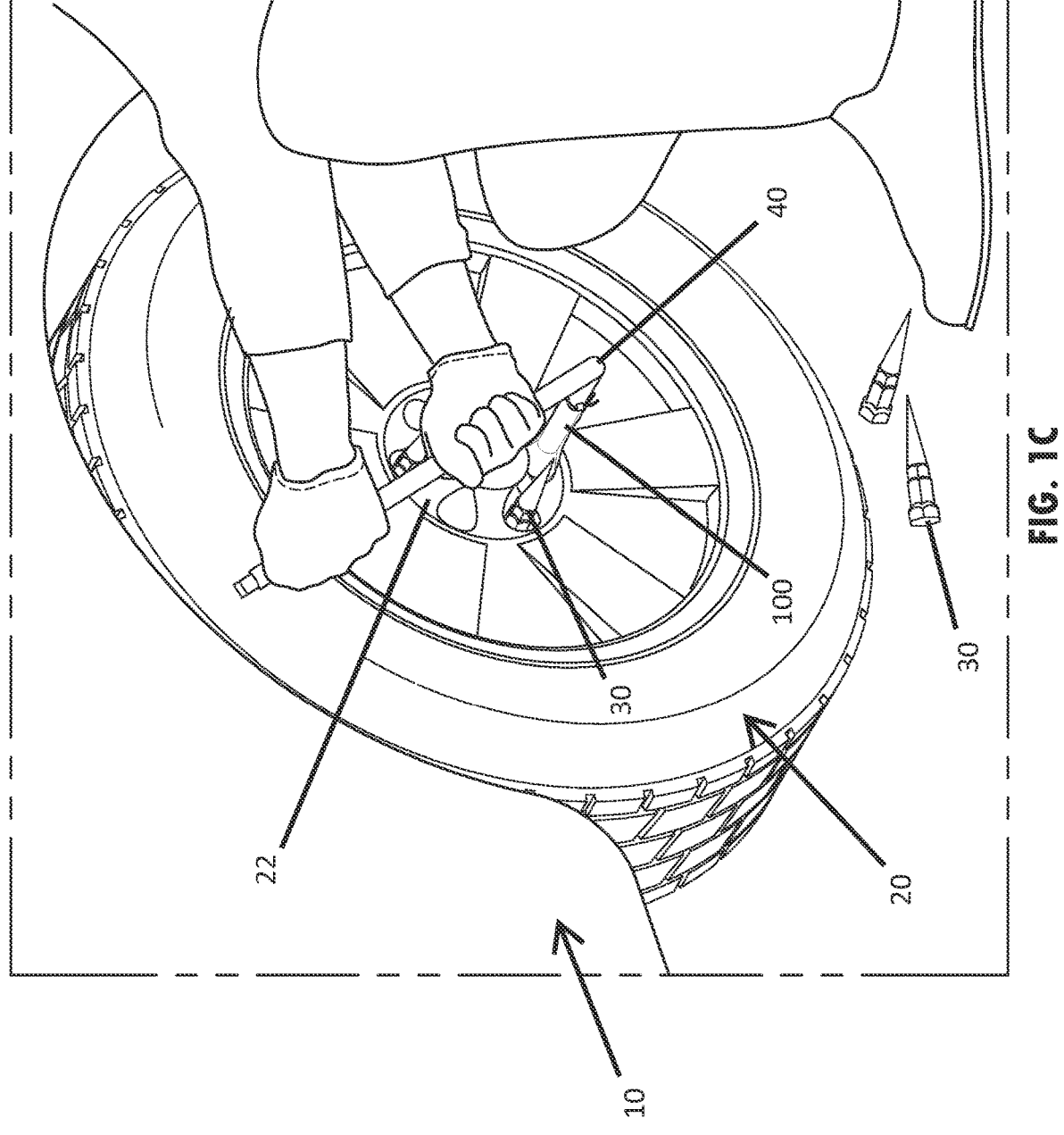

Referring now to the drawings and the illustrative examples depicted therein, a drive socket protector for lug nuts and wheels is provided. As shown in FIGS. 1A-1C, a wheel 20 is provided at a vehicle 10, the wheel having a center disk 22 configured to receive a 5-lug bolt pattern. The bolts 24 extend horizontally in a circular array from a wheel hub or axle or other suitable means for attaching the wheel 20 at the vehicle 10, such that the wheel 20 will be free to rotate about a central axis and collaborate with additional wheels disposed about the vehicle 10 for driving the vehicle 10 across a ground or road surface. The circular array of the bolts 24 comprises the bolt pattern. In additional examples, the bolt pattern may consist of three or more bolts arranged in a circular pattern about the central axis, enabling substantially even support or clamping force at the wheel 20 about the circular pattern at the wheel hub.

Corresponding to the bolt pattern, the wheel 20 presents a circular array of lug holes, which each have a bolt hole portion and a lug hole portion 28. The bolt hole portion are generally through holes configured to receive the bolts 24 from the wheel hub such that a threaded portion of the bolts 24 may be presented at an outer surface 20*a* of the wheel when installed at the vehicle 10. The lug hole portion 28 represent a portion of the hole near the outer surface 20*a* of the wheel having an increased bore diameter so as to accept a lug nut 30. The lug hole portions 28 comprise lug hole seats that are configured to interface with the lug nut 30 engaging the bolt 24. The lug hole portions 28 also include lug hole walls 28*b* defined by a surface of the wheel 20 within the lug hole portion 28 and spanning between the outer surface 20*a* of the wheel and the lug seat. The wheel surfaces may be chrome-plated, powder-coated, paint-coated, polished aluminum, steel or similarly finished. The lug nuts 30 may have a similar surface finish corresponding or matching or contrasting with the finish of the wheel 20.

The wheel surface at the lug hole seats and lug hole walls 28*b* and outer surface 20*a* as well as the exterior surface of the lug nuts 30 are susceptible to scratches caused by installation of the lug nuts 30. As depicted in FIGS. 1A-1C, a variety of socket tools 40, such as impact wrenches, socket wrenches, or lug wrenches, may be used to remove or install lug nuts 30 at a wheel 20. The tools 40 of the illustrated embodiments are depicted with a drive socket protector 100 to prevent such damage. Installation of a lug nut 30 without a drive socket protector 100, however, may lead to scratches caused by direct contact between the socket tool 40 and lug nut 30 or between the socket tool 40 and the lug hole seat or wall 28*b*.

During installation, a wheel 20 is lifted and placed at a vehicle 10 so as to insert the bolts 24 through the holes in the wheel and expose the threaded portion of the bolts 24 at the outer surface 20*a* of the wheel 20. A user may place a lug nut 30 at each bolt 24 and then use a socket tool 40 (such as an impact wrench, lug wrench, or socket wrench) to apply torque and tighten the lug nut 30 to the wheel 20 at the bolt 24. As the socket tool 40 is used to drive the lug nut 30 onto the bolt 24, the lug nut 30 engages the lug hole seat, thus applying a clamping force to retain the wheel 20 at the vehicle 10. If the socket tool 40 is used without a drive socket protector 100, the socket tool 40 will contact the lug nut 30 and may contact the lug hole 28 at the lug hole seat or wall 28*b* due to the rotation or vibration or lateral movement of the socket tool 40 during installation or removal of the lug nut 30. Dependent upon the depth of the lug hole 28, the socket tool 40 may have to contact and press against the lug hole seat or wall 28*b* for an extended period of time. This contact may result in scratches, chips, or other undesirable surface or structural blemishes at the lug nut 30 or lug hole 28 or wheel 20. The drive socket protector 100 aims to form a barrier between the socket tool 40 and the lug nut 30 and lug hole 28 during installation or removal of the lug nut 30 to greatly reduce the chances of surface and structural damages.

Figures 2, 3, 3A, 3B:
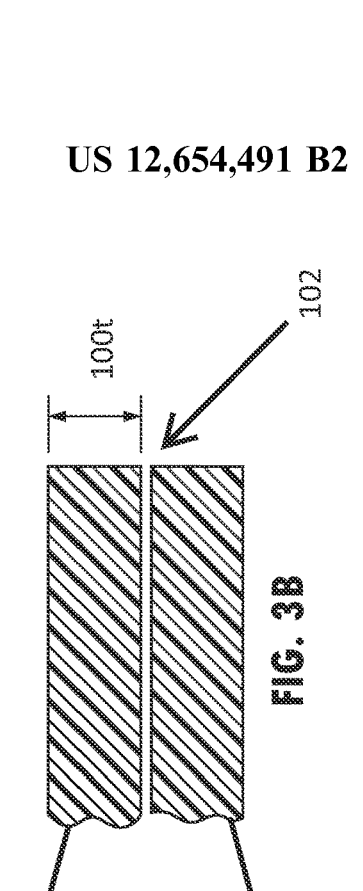
FIG. 2 is a top plan view of a drive socket protector.
FIG. 3 is a side elevation view of a drive socket protector.
FIG. 3A is a cross-sectional view corresponding to section A in FIG. 3.
FIG. 3B is a cross-sectional view corresponding to section B in FIG. 3.

Referring now to FIGS. 2-3B, a drive socket protector 100 is depicted as a singular sheet or piece of material split or wrapped upon itself or otherwise formed as a flexible and hollow sheath or tube having walls 106 between an open end 102 and an enclosed end 104. The open end 102 defined by a perimeter or rim or edge of material (FIG. 3B) and the enclosed end 104 formed by a seamless convergence of two layers or walls 106 of material (FIG. 3A). Thus, the drive socket protector 100 may resemble a tube having one open end and one closed end when the two layers of material are separated and distanced from one another, the two separate layers representing parallel walls 106 of the tube that is the drive socket protector 100. However, as shown in FIG. 3, the layers or walls 106 of the drive socket protector 100 may be configured to lie flat or collapse upon themselves when not in use such that the drive socket protector 100 may resemble a flat and rectangular sheet. The drive socket protector 100 may be formed from a flexible, synthetic polymer having a thickness 100*t* of 0.1 mm or less or another suitably flexible and thin material such as rubber or cloth.

When the two walls 106 of the drive socket protector 100 are separated from one another, such that it resembles a tubular sheath having an open end 102 and an enclosed end 104, the drive socket protector 100 defines an interior volume 110. The interior volume 110 may be configured to receive a socket tool, a lug nut key, or a driving tool in combination or individually such that the devices listed may be retained within the interior volume 110 of the drive socket protector 100 and provided a barrier from a lug nut and lug hole of a wheel. The drive socket protector 100 has a length dimension 100*d* and a width dimension 100*w*, both of which may be altered for various embodiments of the protector designed for different sized socket tools or lug nuts. Common embodiments of the protector may have a length 100*d*, the distance between the open end 102 and enclosed end 104, of between 2.5 inches and 9 inches and a width 100*w* of approximately 2 inches.

A desired length 100*d* may depend upon the length of the socket tool used with the drive socket protector 100. For example, a user may not desire a drive socket protector that has a length 100*d* that substantially exceeds the length of the socket tool disposed within at least because, when the socket tool is disposed at the enclosed end 104 of the drive socket protector 100 and the walls 106 of the drive socket protector 100 are extended proximally at an exterior surface of the socket tool, excess material of the protector 100 may bunch at the driving tool, inhibiting the rotation or other usage of the driving or socket tool. Conversely, a user may not desire a drive socket protector with a length 100*d* substantially less than the length of the socket tool (or combination socket tool, lug nut key, and/or driving tool), such that when the socket tool is disposed at the enclosed end 104 of the protector 100 and the walls 106 of the protector 100 are extended proximally along an outer surface of the socket tool, a substantial portion of the socket tool remains exposed, offering a potential for the socket tool to contact or damage the lug nut or wheel.

Similarly, a user will desire a drive socket protector 100 with a width 100*w* compatible for specific sizes of lug nuts and/or socket tools. For example, a drive socket protector 100 that is not wide enough may not be able to receive its intended socket tool without stretching or tearing the material of the protector 100 or the protector 100 may encase the socket tool too tightly within the interior volume. If the protector 100 wraps around or encases the socket tool too tightly, the protector 100 may be unable to properly engage a lug nut at the enclosed end 104 due to the material of the protector 100 being taut over the lug opening of the socket tool and/or the walls 106 of the protector 100 not being free to move along an exterior surface of the socket tool so that excess material may enter the lug opening as the lug nut conforms to the enclosed end 104 of the protector 100.

The drive socket protector 100 may be configured to receive a variety of socket tools, such as lug wrenches, impact wrenches, socket wrenches, socket tools used in combination with a lug nut key, and other tools compatible with lug nuts and wheel bolts. It should be understood that while the characteristics of the illustrated embodiments may differ, the details and features of the systems and devices and methods described herein are not intended to be exhaustive or encompass all of the potential applications or benefits of a drive socket protector. Thus, the inclusion or exclusion of a given detail or feature in relation to a specific illustrated embodiment should not be read to necessitate the inclusion or exclusion of that detail or feature in all like embodiments.

Referring now to FIGS. 4-7, a drive socket protector 100 is depicted with a socket tool 140 having a socket 142 with a lug opening 144 defined by the perimeter of a recess 144*a* in the socket tool configured to receive a lug nut 130. In this example, the socket 142 is a standard socket capable of fitting many configurations of lug nuts and bolts based on the size of its lug opening 144. In some examples, the socket tool may include a lug nut key that engages the socket, such as to provide a receptor matching the specific lug nut.

Figures 6, 7:
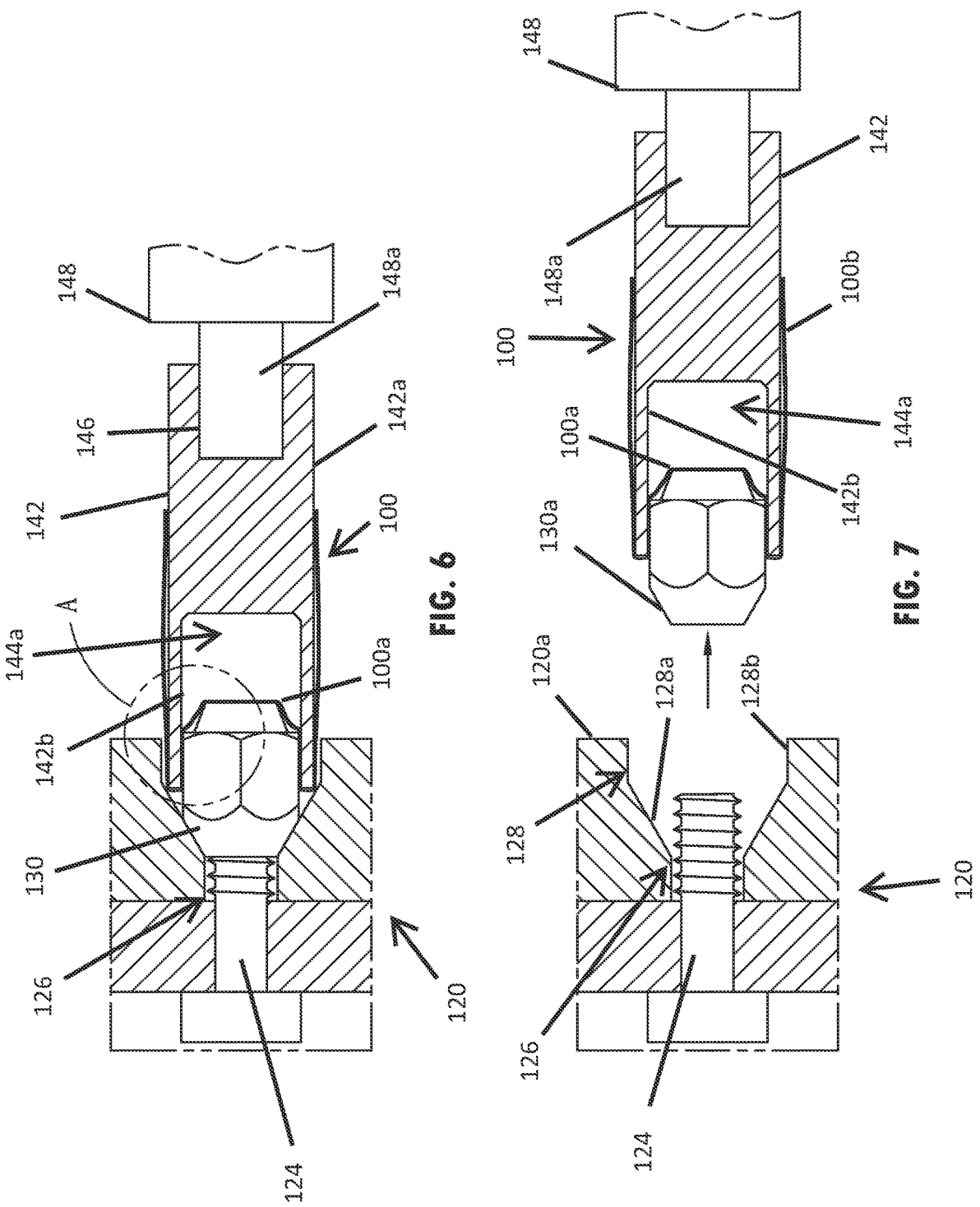

In continued reference to FIGS. 4-7, the socket 142 has a female square connection fitting 146 configured to receive a driving tool 148 for driving or turning the socket 142 and therefore lug nut 130. The driving tool 148 may be a ratchet having a male square connector 148*a* that snap-attaches to the female square connection fitting 146, such as in the illustrated embodiment, or may be a similarly configured impact wrench. The socket 142 of the illustrated embodiment has an exterior surface 142*a* that engages an interior surface 100*a* of the walls 106 of the drive socket protector 100. The socket 142 also has an interior surface 142*b* at the recess 144*a* configured to receive a lug nut 130. The interior surface 142*b* engages a portion of the interior surface 100*a* of the protector 100 extended through the lug opening 144 into the recess 144*a* by the presence of a lug nut 130 thereat (as shown in FIGS. 6 and 7).

Figures 4, 5:
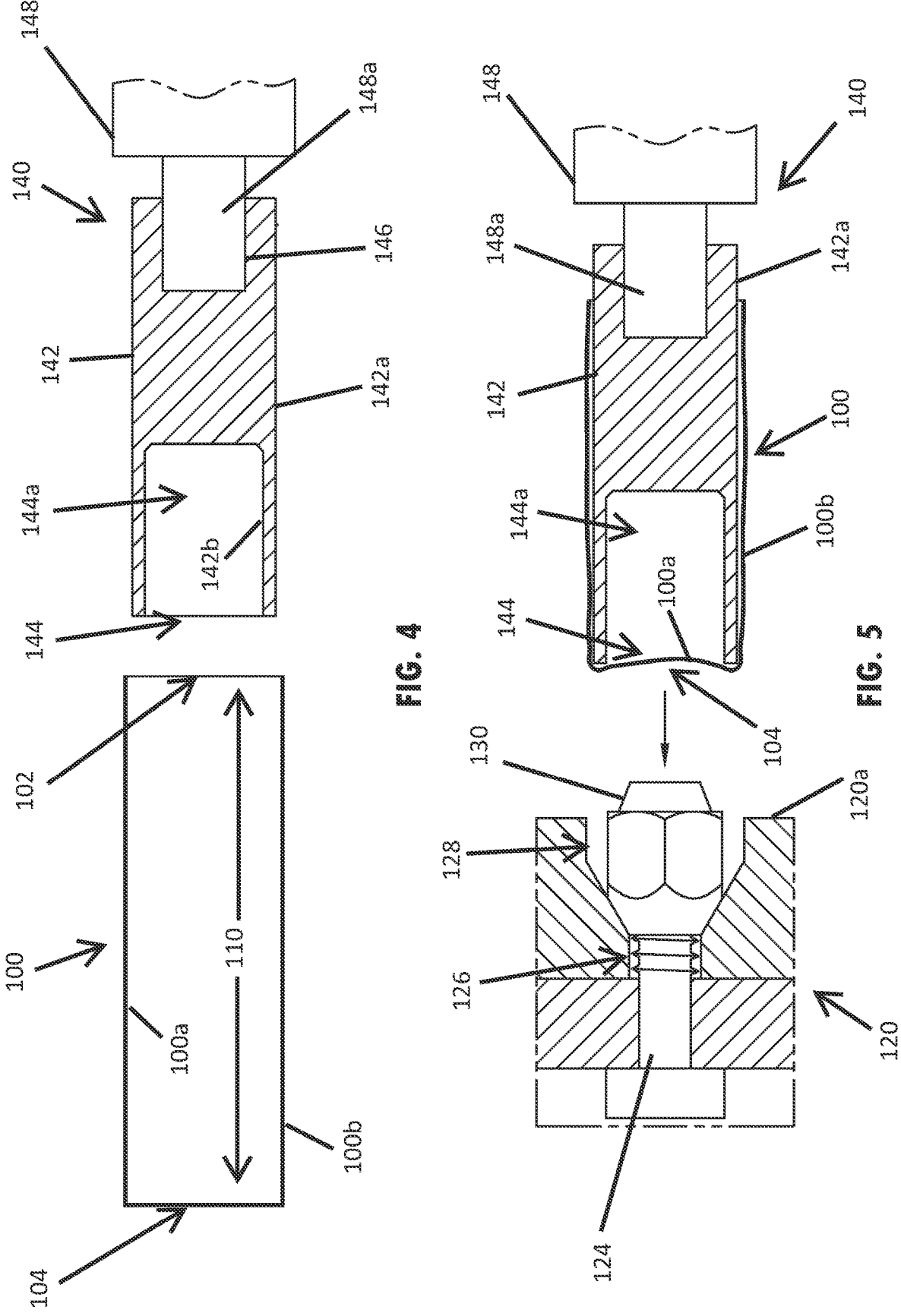
FIG. 4 is a cross-sectional view of a drive socket protector with a socket tool.
FIGS. 5-7 are cross-sectional views of a drive socket protector in use on a socket tool during different stages of removing a lug nut from a wheel.

FIGS. 5-7 depict various stages of the removal of a lug nut 130 from a bolt 124 at a wheel 120 by a socket tool 140 having a socket 142 and driving tool 148. The bolt 124, disposed at a wheel hub of a vehicle, extends from the wheel hub into the bolt hole portion 126 and the lug hole portion 128, such that the threaded portion of the bolt is exposed in the lug hole portion 128. The lug nut 130, as it is installed on the bolt 124, is engaged with the lug seat 128*a* of the lug hole portion 128. The lug hole wall 128*b* is spaced from the lug nut 130 so as to permit the engagement of a socket tool 140 at the lug nut 130. In this example, the lug hole seat 128*a* is angled to match the angled engaging surface 130*a* of the lug nut 130 and is spaced from the outer surface 120*a* of the wheel 120 such that the installed lug nut 130 may appear sunken into the thickness of the wheel 120. Thus, the socket tool 140 must substantially engage the lug nut 130 within the lug hole portion 128, such as shown in FIG. 6.

As depicted, the drive socket protector 100 is disposed at the socket tool 140 such that the interior surface 100*a* at the enclosed end 104 of the drive socket protector 100 interfaces with the lug opening 144 and the walls 106 of the protector 100 extend proximally along the exterior surface 142*a* of the socket 142. Thus, the socket 142 is substantially enclosed by the drive socket protector 100 with the driving tool 148, or other addition/extension of the socket tool 140, emanating from the drive socket protector 100 at the open end 102. The walls 106 of the drive socket protector 100 sit in loose connection with the exterior surface 142*a* of the socket 142 such that the socket 142 is relatively free to move within the interior volume 110. Additionally, as the socket tool 140 engages a lug nut 130, the walls 106 of the protector 100 will conform to both the lug nut 130 and interior surface 142*b* of the socket 142.

In the direction of the arrow of FIG. 5, a user engages the socket tool 140 with the lug nut 130 at the lug opening 144 such that the lug nut 130 will engage the exterior surface 100*b* of the protector 100 at the enclosed end 104. As the socket tool 140 engages the lug nut 130, the exterior surface 100*b* of the drive socket protector 100 at the enclosed end 104 conforms to the surface of the lug nut 130. Simultaneously, the interior surface 100*a* of the protector 100 conforms to the interior surface 142*b* of the socket 142 at the recess 144. As the socket 142 is pressed further onto the lug nut 130, the lug nut 130 becomes further disposed within the recess 144 (as depicted in FIG. 6) and a portion of the drive socket protector 100 will be pulled into the recess 144 (from the exterior surface 142*a* of socket 142) and disposed between the socket tool and the lug nut. The drive socket protector 100 will move freely along the exterior surface 142*a* of the socket 142 so as to provide the necessary amount of material to conform to the surface of the lug nut 130 and interior surface 142*b* in the recess 144. Thus, the drive socket protector 100 provides a thin barrier between the socket 142 and the lug nut 130 as the socket 142 engages the lug nut 130 at the wheel.

Moreover, the drive socket protector 100 is configured to provide enough material to conform to the surface of the lug nut 130 within the recess 144 and also enough material to provide a substantial barrier between the socket tool 140 and surfaces of the lug hole 128 and wheel 120. Even with the lug nut 130 disposed within the recess 144 (and thus pulling a portion of the protector 100 into the recess 144 from the exterior surface 142*a* of the socket 142), the illustrated embodiment of the drive socket protector 100 is able to cover the entirety of the exterior surface 142*a* of the socket 142 disposed within the lug hole 128 (see FIG. 6) as well as a significant portion of the socket tool 140 distanced from the wheel 120.

Figure 6A:
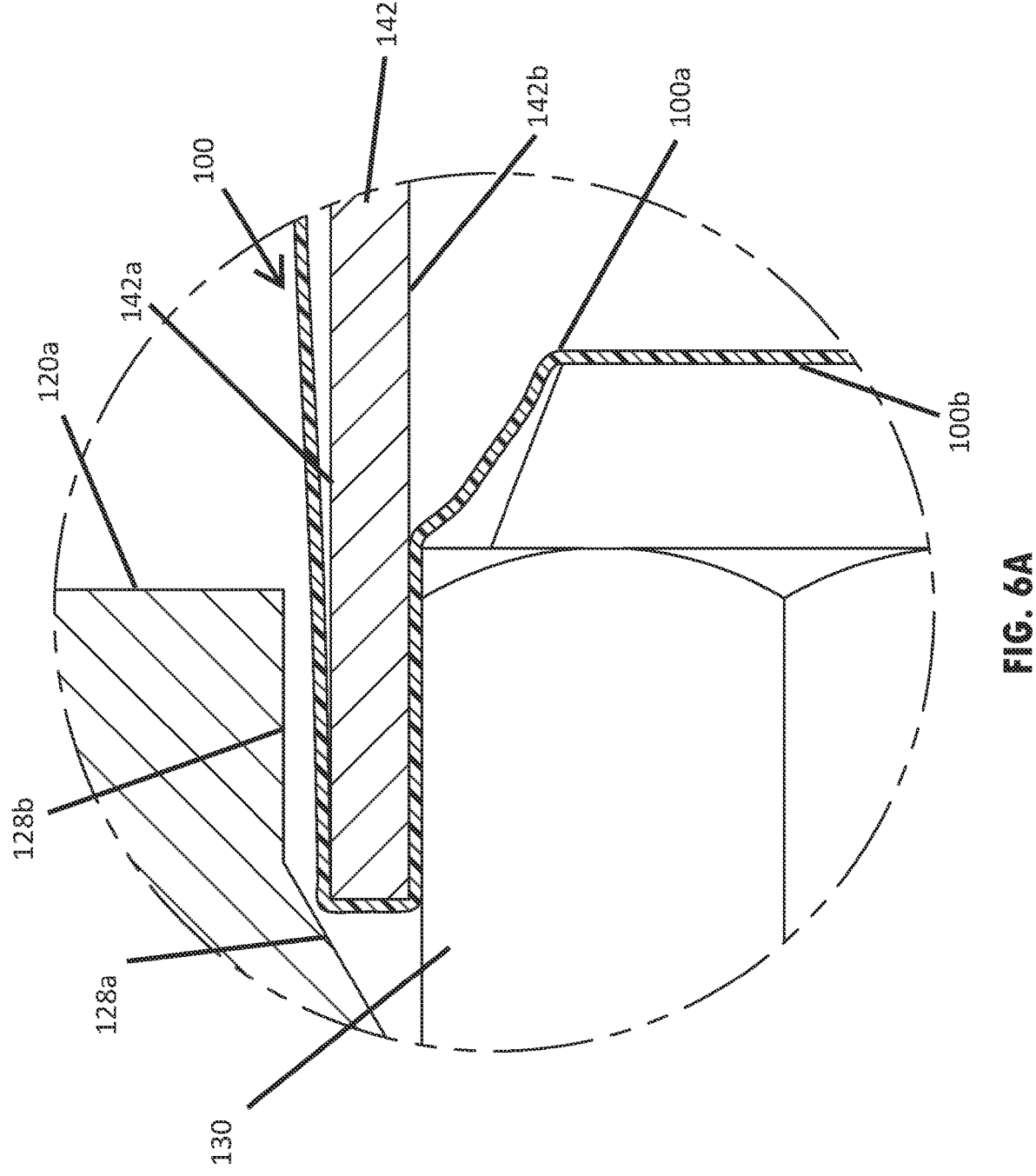
FIG. 6A is a cross-sectional view corresponding to section A in FIG. 6.

As shown in FIG. 6A, an installation or removal of a lug nut 130 at a wheel may be possible without contacting the surfaces of the wheel or lug hole 128. FIG. 6A shows a socket 142 engaging a lug nut 130 (with a protector 100 disposed between) at a lug hole 128 with neither the socket tool nor protector 100 engaging a surface of the lug hole 128 or wheel 120. However, inadvertent movement of the socket 140, as it turns the lug nut 130 or engages or disengages the lug nut 130 from the bolt 124, may cause contact between the drive socket protector 100 and the wheel 120, lug hole seat 128a or wall 128b. Thus, even in settings in which a socket tool may only rarely or unintentionally contact the wheel or lug hole, it remains desirable to utilize a drive socket protector 100 with the socket tool.

Once the socket tool 140 is engaged with the lug nut 130, as shown in FIG. 6, (with the drive socket protector 100 disposed between the socket 142 and the lug nut 130) the socket tool 140 may operate to loosen and disengage the lug nut 130 from the bolt 124. The drive socket protector 100 provides no noticeable interference in the usual operation of a socket tool in removing a lug nut (other than to provide a barrier between the tool and the wheel and lug nut). As shown in FIG. 7, the drive socket protector 100 may help to retain the lug nut 130 at the socket 142 as the socket tool 140 is pulled away from the bolt 124 (in the direction of the arrow shown in FIG. 7). However, the drive socket protector 100 maintains a barrier between the lug nut 130 and the socket 142 so as to prevent scratches at the lug hole 128 or lug nut 130.

Turning now to FIGS. 8-11, a drive socket protector 100 may be disposed at socket tool 240 having a lug nut key 242 configured to engage a corresponding lug nut 230. Although some details regarding the illustrated example in FIGS. 8-11 may differ from other examples provided by this disclosure, the function of the drive socket protector 100 remains similar between the multiple examples, such that a full description may not be necessary to express the full functionality of the drive socket protector in each embodiment. It should be understood that the characteristics and/or functionality of the drive socket protector 100 as discussed in relation to one example of the disclosure may be applicable to other examples within (or outside the scope of) the present disclosure even if those characteristics are not expressly described within the context of that example.

In FIGS. 8-11, much like a traditional socket, the lug nut key 242 may be snap-attached to a driving tool 248 and has a lug opening 244 defined by an edge or perimeter of a recess 244a at which the lug nut 230 is received. Similar to the socket of FIGS. 4-7, the lug nut key 242 has a female square connector 246 for receiving the male connector 248a of the driving tool. However, the lug nut key 242 is unlike a traditional socket in that the interior surface 242b comprises a unique pattern of ridges and valleys corresponding to an alternative pattern of ridges and valleys on the exterior surface of the lug nut 230. Thus, a traditional socket may not be able to engage the lug nut 230 and a lug nut key 242 corresponding to the surface pattern of the lug nut 230 may be required to engage the lug nut 230 with a socket tool. The drive socket protector 100 is disposed at the lug nut key 242 in a similar fashion as embodiments above, with the lug opening 244 disposed at the enclosed end 104 of the drive socket protector 100. The walls 106 of the protector extend proximally along an exterior surface 242a of the lug nut key 242 so as to substantially provide a barrier at the lug nut key 242. The ridged interior surface 242b of the lug nut key 242 and ridged surface 230b of the lug nut 230 present a more complex surface relationship between which the drive socket protector 100 will be disposed, relative to that of a traditional socket and lug nut (such as that in FIGS. 4-7). However, the pliable nature of the drive socket protector 100 ensures that engagement of this type of lug nut 230 with a lug nut key 242 occurs in a similar fashion to engagement of other types of lug nuts (such as those in FIGS. 18A-18H) and the corresponding socket tools needed to fasten those lug nuts at their bolts. Thus, the drive socket protector 100 is capable of conforming to a wide variety of different surface configurations without interfering in the usual operation of the socket tool.

Figures 8, 9:
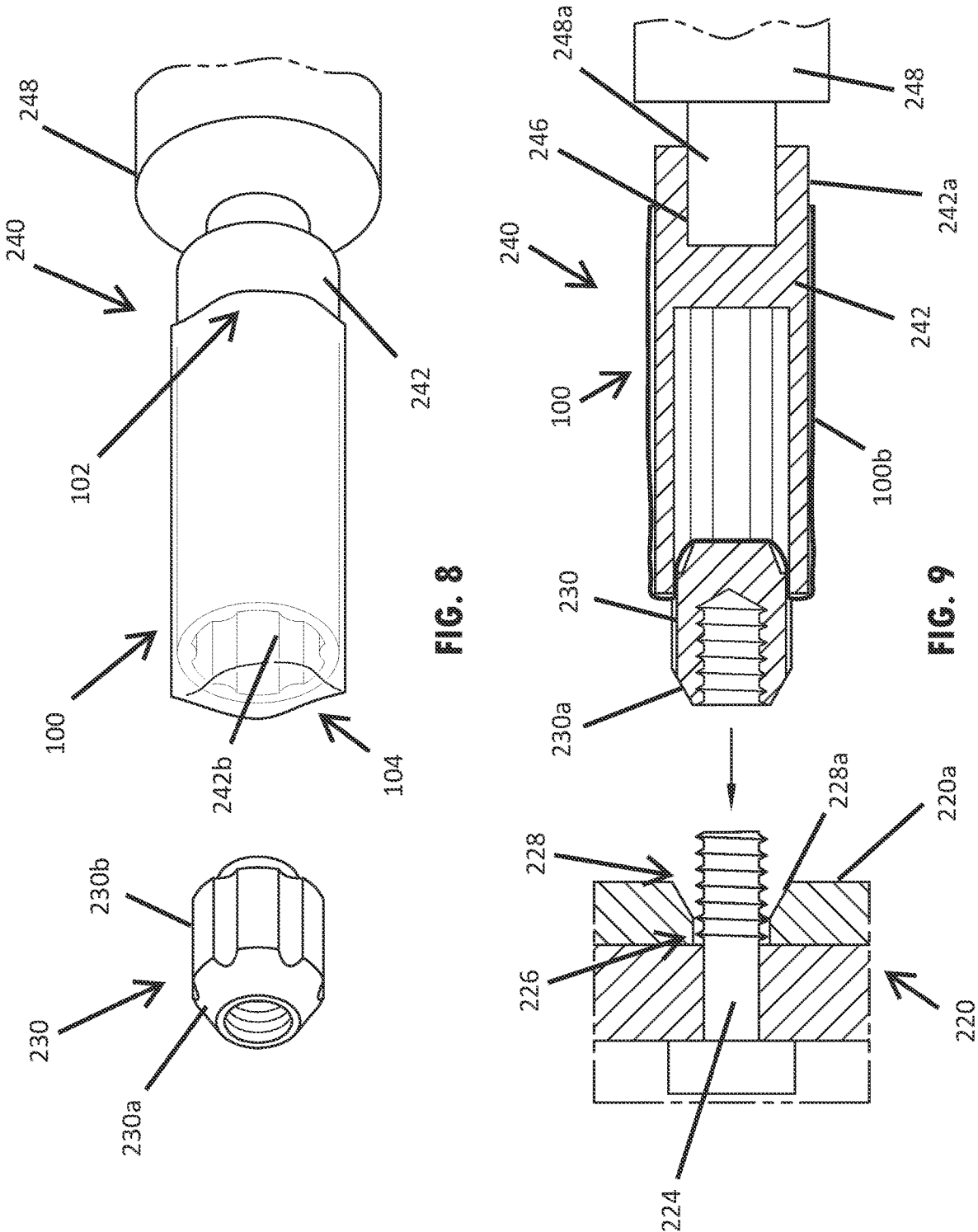
FIG. 8 is a perspective view of a drive socket protector on a lug nut key with a lug nut corresponding to the lug nut key.
FIGS. 9-11 are cross-sectional views of a drive socket protector in use on a lug nut key during different stages of installing a lug nut corresponding to the lug nut key at a wheel.
Figures 10, 11:
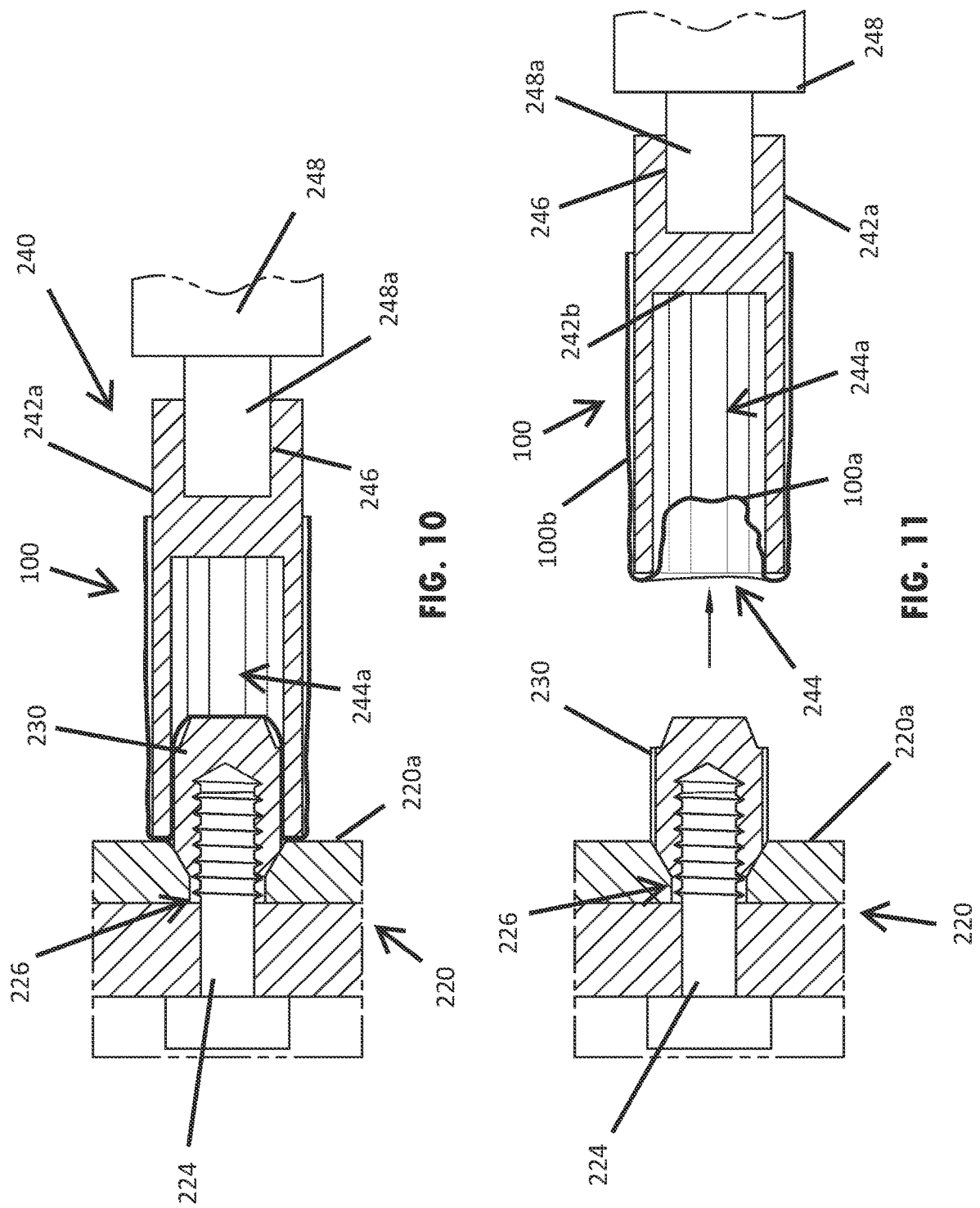

FIGS. 9-11 depict various stages of the installation of a lug nut 230 on a bolt 224 at a wheel 220 by a socket tool 240 comprising a lug nut key 242 and a driving tool 248, where the lug nut key 242 is configured to receive the lug nut 230. The bolt 224, disposed at a wheel hub of a vehicle, emanates from the wheel hub, through the thickness of the wheel 220 and at the bolt hole 226 and lug hole 228, such that the threaded portion is exposed at an outer surface 220a of the wheel 220. In this embodiment, the lug nut 230 has an angled bottom 230a (corresponding to an angled lug nut seat 228a of the lug hole 228) and a ridged outer surface 230b matching the ridged interior surface 242b of the lug nut key 242. The thread of the lug nut 230 of course matches the thread of the bolt 224. In this embodiment, the lug hole 228 angles continuously from the bolt hole 226 to the outer surface 220a of the wheel 220 such that the lug hole 228 presents only a lug hole seat 228a without a substantial lug hole wall.

As shown in FIG. 9, a lug nut 230 is disposed at the lug nut key 242 in preparation of installing the lug nut 230 onto the bolt 224 at the wheel 220. The drive socket protector 100 is installed covering the lug nut key 242 and forming a barrier between the lug nut key 242 and the lug nut 230, including at the interior surface 242b defining the recess 244a. Although the drive socket protector is thin, pliable, and mobile along the surfaces of the socket tool 240, the presence of the drive socket protector 100 between the lug nut 230 and the interior surface 242b helps to retain the lug nut 230. During installation, a user engages the lug nut 230 with the bolt 224, in the direction of the arrow shown in FIG. 9, using the socket tool 240. As the lug nut 230 engages the bolt 224, the driving tool 248 rotates the lug nut key 242 such that the lug nut 230 is driven onto the bolt 224.

When the lug nut 230 is fully driven onto the bolt 224, such as seen in FIG. 10, the lug nut engages the seat 228a of the lug hole 228. In contrast to the embodiments of FIG. 5-7 or FIGS. 13-15, the socket tool 240 here engages the outer surface 220a of the wheel as the lug nut 230 is driven onto the bolt 224. Thus, rather than provide a barrier between the socket tool and a lug hole wall or lug hole seat, the drive socket protector 100 provides a barrier between the lug nut key 242 and the outer surface 220a of the wheel 220.

During disengagement of the socket tool 240 from the installed lug nut 230, the socket tool 240 is pulled from the lug nut 230 in the direction of the arrow of FIG. 11. As the socket tool 240 disengages from the lug nut 230, the lug nut 230 remains at the wheel 220 and releases from the drive socket protector 100. Thus, the drive socket protector 100 is retained at the socket tool 240. While the wheel 220 of this embodiment does not provide an obstacle in the way of, or proximate to, the socket tool 240 (such as a lug hole wall) during the disengagement, other embodiments (such as in FIGS. 5-7 or 13-15) will provide such an obstacle and retaining the drive socket protector 100 at the socket tool 240 ensures that a barrier is provided between the socket tool 240 and the surfaces of the wheel during the complete process of installing or removing a lug nut at a wheel.

As shown in FIGS. 12A-15, a socket tool 340 includes both a socket 342 and a lug nut key 342k depicted with a drive socket protector 100 containing portions of both components within the interior volume 110 of the protector 100. Although a socket 342 is shown receiving the lug nut key 342k, other examples may have an impact wrench, lug wrench, or other tool receiving the lug nut key 342k within the interior 110 of the protector 100. Unlike the lug nut key of FIGS. 8-11, the lug nut key 342k of this example is not snap-attached (such as via a male-female square connector) to its counterpart socket 342. When a lug nut key (or any socket tool) is not or cannot be attached to its corresponding tool via a retaining mechanism (such as the snap-attachment square connectors described above), it may require a user to hold the lug nut key at its corresponding socket or driving tool to maintain the connection thereat. Thus, a user frequently must use one hand to maintain the connection or interface or relationship at the lug nut key and socket or driving tool while the other hand turns the ratchet, drives the impact wrench, or otherwise applies the rotational force. This is undesirable because a user, especially one utilizing an impact wrench, may prefer to have a free hand to steady themselves, steady the impact wrench, steady the wheel to which the lug nut is being installed, or otherwise assist in the task. A benefit shown by the example of FIGS. 12A-15 is that the drive socket protector 100 may be configured to receive multiple components of a socket tool 340 within its interior volume 110 and maintain the connection thereat. That is to say that the interior volume 110 of the drive socket protector 100 may be configured to hold both a lug nut key and a socket tool in close relation to maintain the connection or interface or relationship thereat.

FIG. 12B shows a drive socket protector 100 with a lug nut key 342k contained wholly within its interior volume 110 with at least a portion of the socket tool 342 also retained within the interior 110. The walls 106 of the drive socket protector 100 extend proximally along the exterior surface 342a of both the lug nut key 342k and the socket tool 342 so as to preclude movement of the key 342k from the socket 342. Disposed at the enclosed end 104 of the protector 100, and pressed into the lug opening 344 is a lug nut 330 having a ridged surface 330b configured to match the interior surface 342b of the key 342k. The lug nut 330 also has a rounded bottom surface 330a configured to mate with the rounded lug nut hole seat 328a of the wheel 320, the lug hole wall 328b spaced from the lug nut 330 so as to provide room for the engagement of the socket tool 340.

Figures 14, 15:
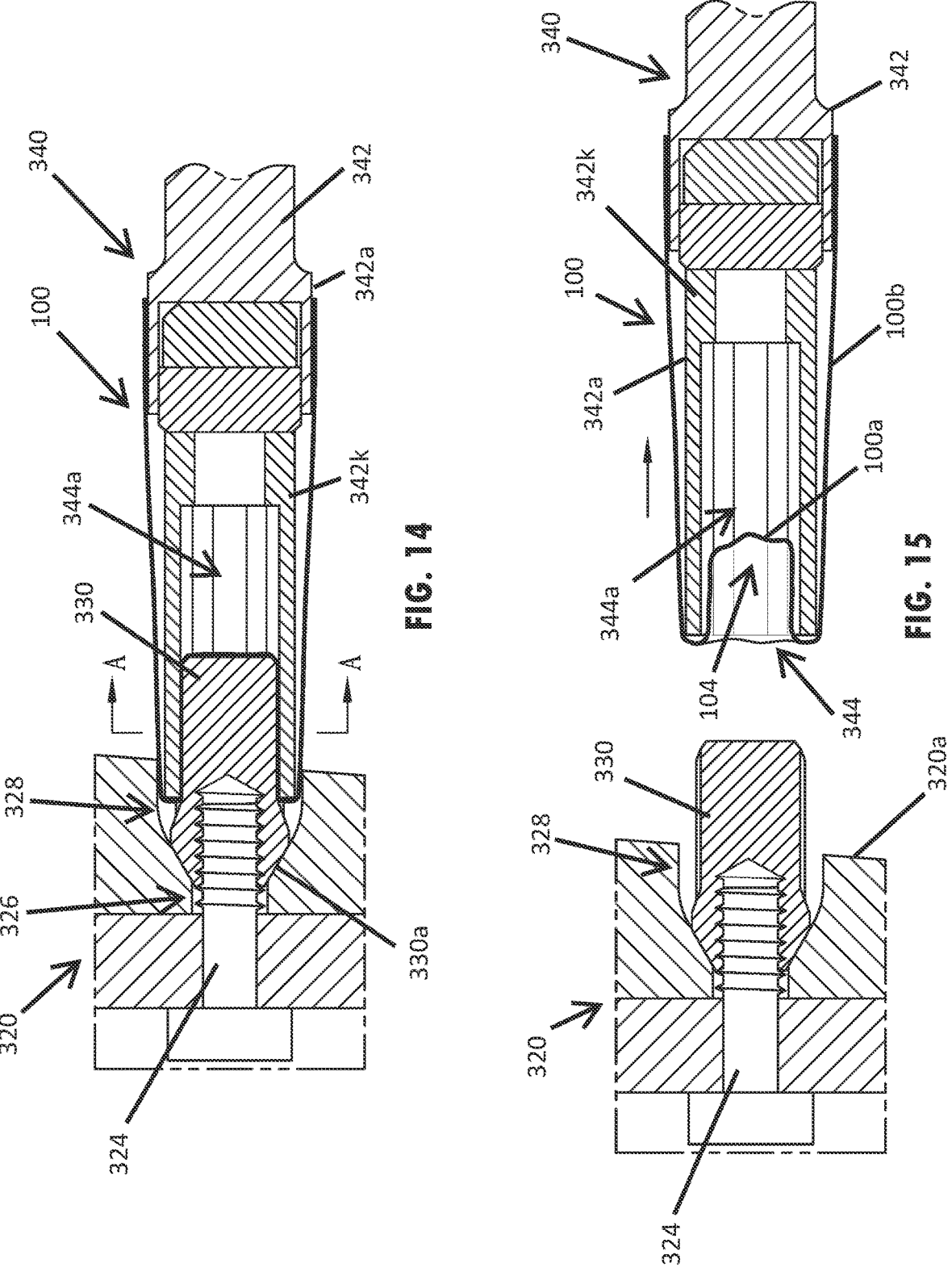

FIGS. 13-15 depict various stages of the installation of a lug nut 330 on a bolt 324 at a wheel 320 by a socket tool 340 comprising a lug nut key 342k, and socket 342, the lug nut key 342k configured to receive the lug nut 330. The bolt 324, disposed at a wheel hub of a vehicle, emanates from the wheel hub, through the thickness of the wheel 320 and at the bolt hole 326 and lug hole 328 such that the threaded portion is exposed at an outer surface 320a of the wheel 320. Much of the installation occurring in FIGS. 13-15 mirrors the processes described above such that a full discussion need not be repeated here. One exception, however, is that the drive socket protector 100 retains both the lug nut key 342k and socket 342 within its interior 110 throughout the full installation process, providing support to the connection between the two components at the exterior surfaces of the socket tool 342a.

Figures 14A, 14B:
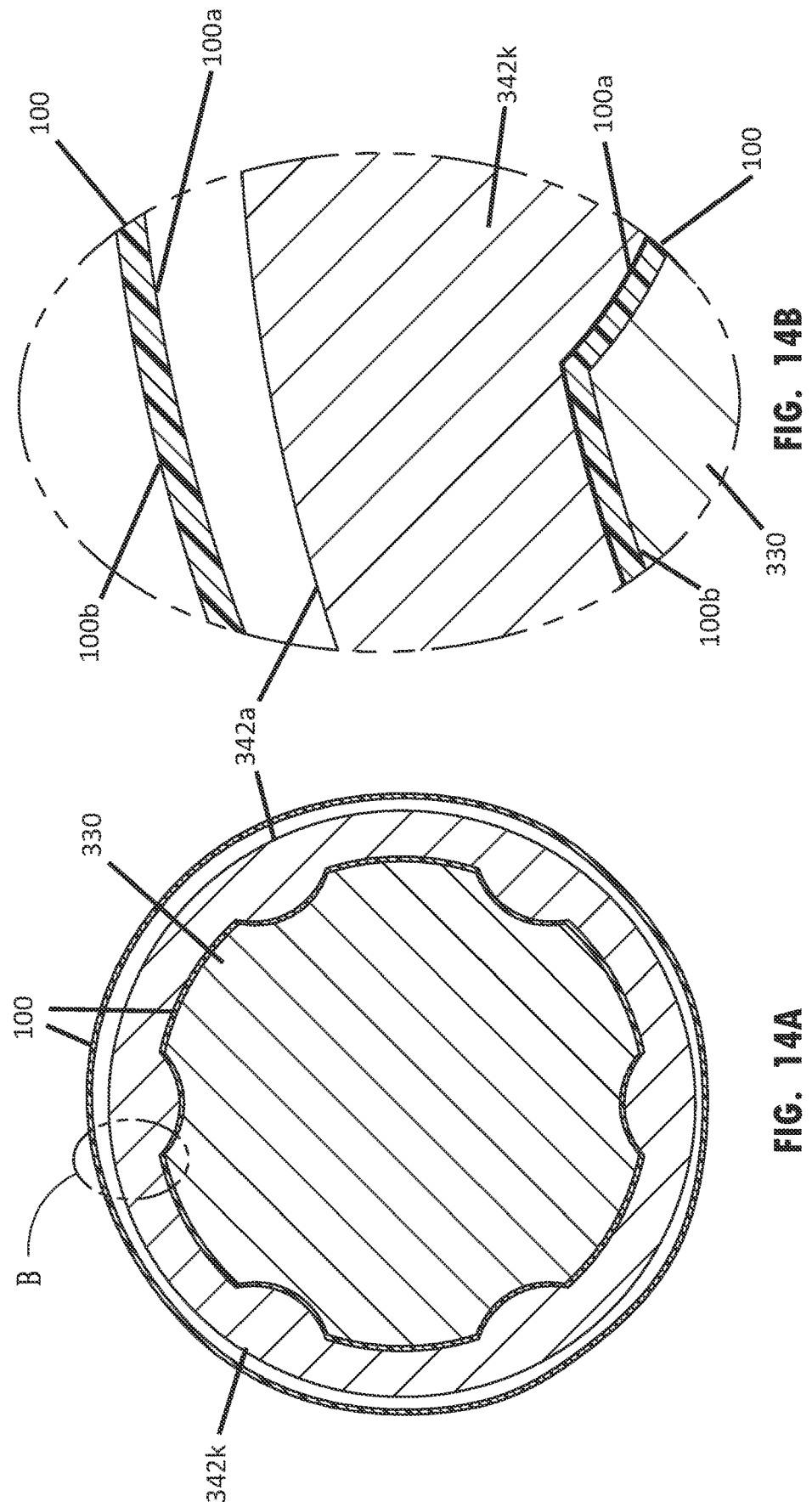
FIG. 14A is a cross-sectional view corresponding to section A in FIG. 14.
FIG. 14B is an enlarged view of section B in FIG. 14A.

FIGS. 14A and 14B, which are cross-sections of the lug nut key 342k, lug nut 330, and drive socket protector of FIG. 14, illustrate that the drive socket protector is capable of maintaining a loose or even non-contacting relationship with the exterior surface of a socket tool while also conforming substantially to the interior surface of the socket tool and exterior surface of the lug nut disposed therein. Thus, the drive socket protector remains mobile at the exterior surface of the socket tool and maintains a barrier across all surfaces contacting the lug nut and socket tool. The illustrated embodiment shows a drive socket protector 100 surrounding a lug nut key 342k with a lug nut 330 disposed within the recess 344a, the drive socket protector disposed between and in direct contact with both the lug nut 330 and the interior surface 342b of the lug nut key 342k.

Figures 16A, 16B, 16C:
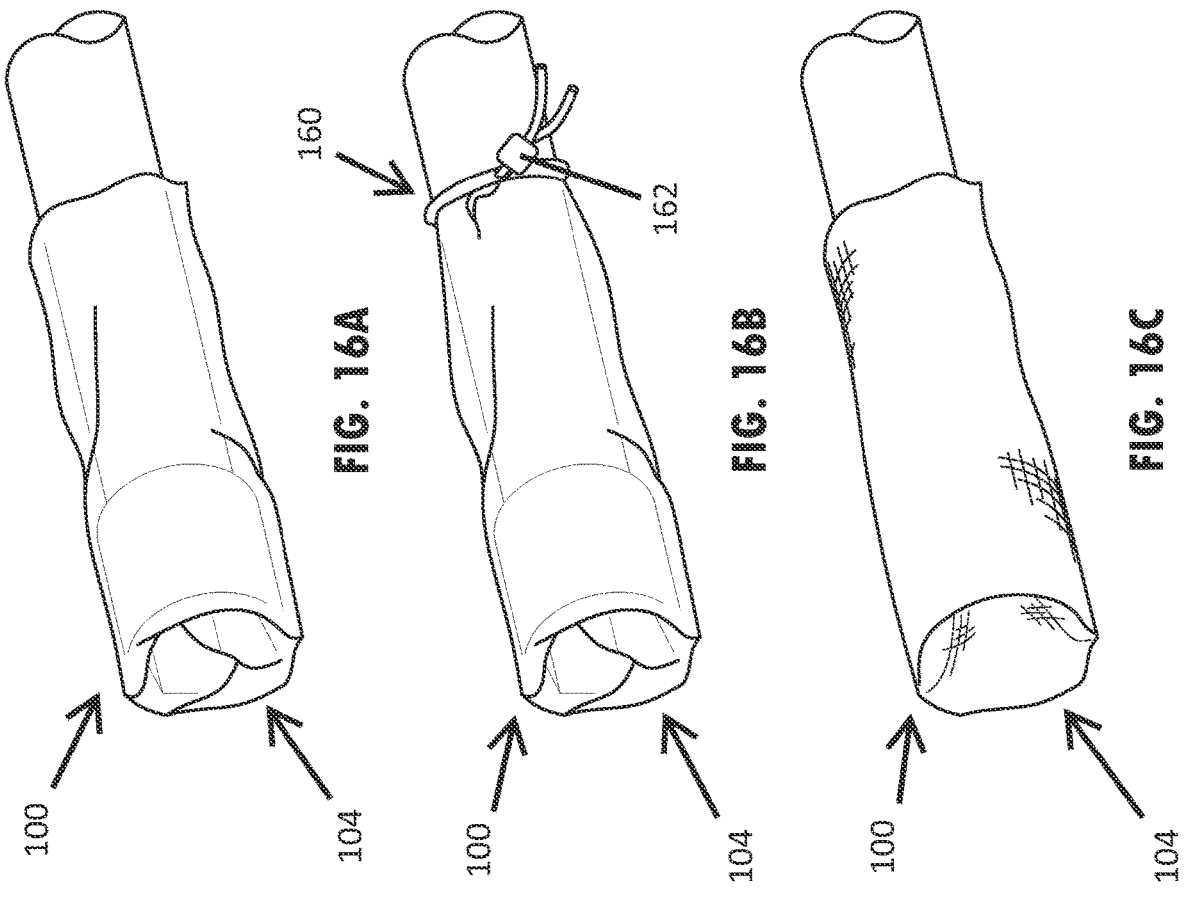
FIG. 16A is a perspective view of a drive socket protector made from a synthetic polymer material.
FIG. 16B is a perspective view of a drive socket protector made from a synthetic polymer material and showing a drawstring.
FIG. 16C is a perspective view of a drive socket protector made from cloth.

Various embodiments of the drive socket protector, as seen in FIGS. 16A-16C, may be formed from different materials capable of providing different advantages. For example, a drive socket protector may be manufactured from a thin plastic or other synthetic polymer (FIGS. 16A and 16B) or from a thin sheet of cloth, rubber, or other suitably durable material (FIG. 16C). The embodiments of FIGS. 16A and 16B provide a drive socket protector configured for single or disposable use because they may not provide extended durability, but can be manufactured at a relative low cost per unit. The drive socket protectors manufactured from synthetic polymer materials are capable of conforming to the surfaces of the lug nuts and socket tools on which they are used, but if they significantly stretch during use, the material may not rebound to an original state as easily as the drive socket protectors like that of FIG. 16C. Other embodiments, such as in FIG. 16C, manufactured from a thin sheet of cloth, rubber, or other suitably durable material may be configured for reusable applications because the protector may stretch to conform to the surfaces of the lug nut and socket tool and rebound to an original state. These embodiments may have a higher manufacturing cost, but provide extended durability designed for repetitive use. Some users, such as professional mechanics, may prefer embodiments designed for disposable use because of their lower cost per unit relative to embodiments designed for reusable applications. Other users, such as those who purchase the drive socket protector for personal use, may prefer the increased durability of embodiments designed for reusable applications. The material of the drive socket protector may also dictate whether the protector is transparent (such as FIGS. 16A and 16B) or opaque (FIG. 16C). A transparent drive socket protector allows a user to view the socket tool through the protector for such purposes as confirming a continued connection between a lug nut key and its socket. A logo or design or measurement tool may be screen printed on the outside surface of the drive socket protector 100.

The illustrated embodiment of the drive socket protector shown in FIG. 16B further comprises a drawstring 160 disposed at the tubular wall and configured to compass an outer ring of the elongated receptacle, such as at the exterior surface 100b at or near the open end 102. Here, the drawstring 160 is a length of cord or cord-like element received at each of its ends by a cord stopper 162, the length of cord extending from the cord stopper 162, looping back, and being received by and passing through the cord stopper 162. A user may depress a button on the cord stopper 162 to loosen its grip on one end of the length of cord, allowing the user to pull the cord further through the cord stopper 162 to enclose the loop of cord around the drive socket protector 100 and socket tool. Similarly, with the button depressed, a user may pull on the looped portion of the cord to release the cord from the cord stopper 162 and enlarge the looped portion of cord, thus loosening the drive socket protector 100 from the socket tool. The drawstring 160 may also be a loose string or cord (requiring a user to tie a knot to tighten the drawstring around the protector and socket tool), a zip tie, or other suitable means for retaining the drive socket protector 100 at the socket tool. When using a drive socket protector with a drawstring mechanism, a user may wish to manually depress the enclosed end 104 of the protector 100 into the lug opening prior to tightening the drawstring 160 so that when the enclosed end 104 is engaged with a lug nut, the drive socket protector 100 is not taut across the lug opening preventing the engagement of the lug nut at the socket tool. Unlike embodiments without a drawstring mechanism, the drive socket protector 100 may not be free to move across the surface of the socket tool as the lug nut is received by the socket tool at the lug opening due to the drawstring 160 retaining the socket protector 100 at the socket tool.

Figures 17A, 17B:
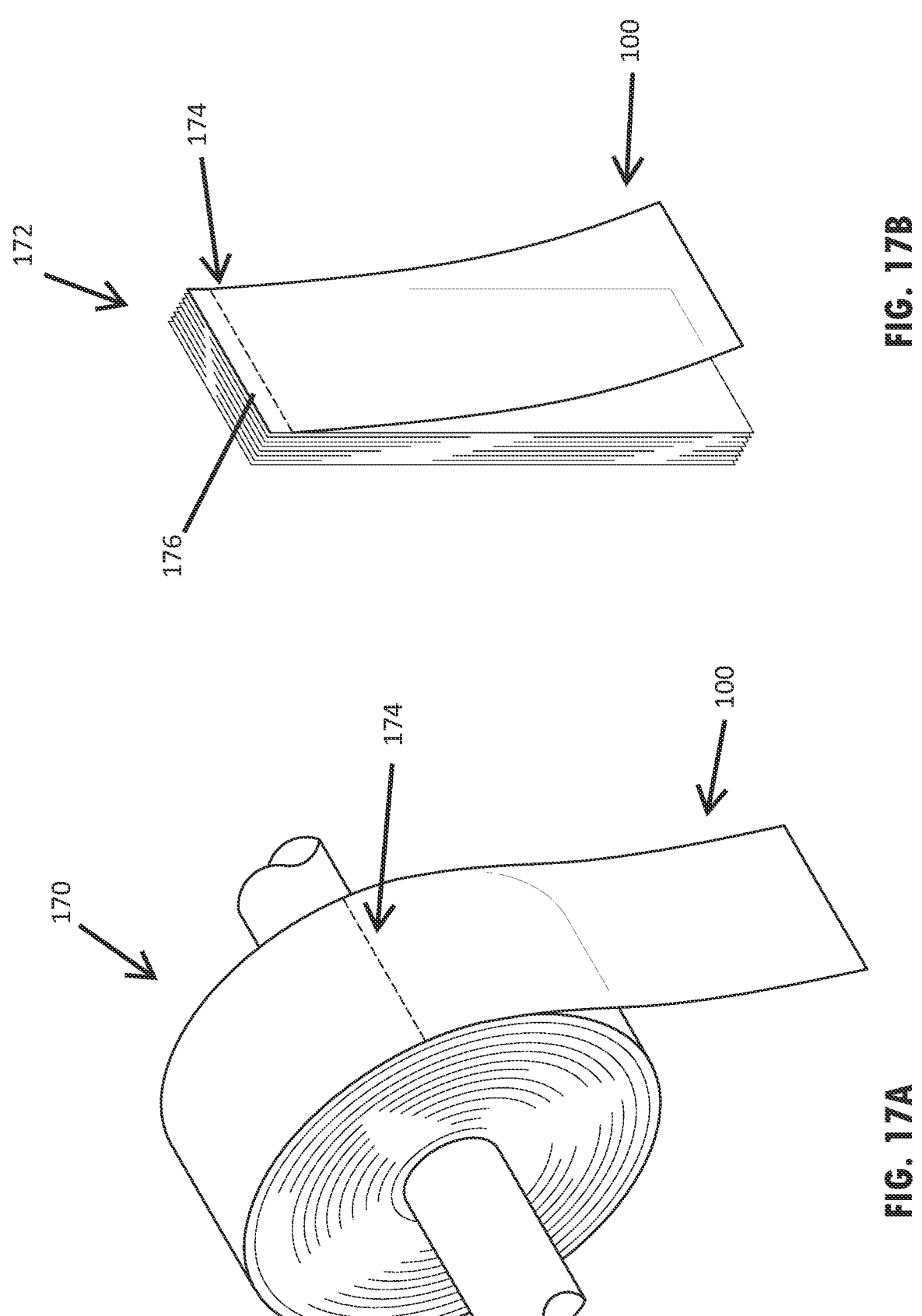
FIG. 17A is a perspective view of a roll of drive socket protectors configured to separate at a tear-point for dispensing.
FIG. 17B is a perspective view of a stack of drive socket protectors configured to separate at a tear-point for dispensing.

Turning now to FIGS. 17A and 17B, various embodiments of the drive socket protector 100 may be dispensed from a roll 170 (FIG. 16A) or booklet 172 (FIG. 16B) in which multiple drive socket protectors are coupled together and releasable at a tear-point or serrated edge 174. As mentioned above, the pliable nature of the walls 106 of the protector 100 allow the sheath or tube-like shape of the protector 100 to collapse or flatten upon itself to resemble a substantially flat sheet. This quality allows multiple protectors 100 to be packaged together such as in the illustrated embodiments. In FIG. 17A, the multiple drive socket protectors 100 are attached to one another via tear points or serrated edges 174 coupled together. The material forming the enclosed end 104 of one drive socket protector 100 is attached to the material at the open end 102 of the next protector 100 on the roll 170 and so on. A user pulls on the drive socket protector 100 at the end of the roll 170, releasing the protector from the roll at the serrated edge 174 and rotating the roll 170 so that the next protector 100 is in position to be dispensed in a similar fashion. In FIG. 17B, multiple drive socket protectors 100 are stacked upon each other, releasably connected in a booklet-like form where each protector 100 is releasably connected to a tab 176 via a serrated edge 174 and the multiple tabs 176 of the protectors 100 are bound together. Thus, when a user pulls a drive socket protector 100 from the booklet 172, the protector releases from its corresponding tab 176 and the tab 176 remains bound to the rest of the booklet 172. The serrated edge 174 may be at the enclosed end or open end of the protector 100.

Also for purposes of this disclosure, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A drive socket protector for wheels and lug nuts comprising:
 a flexible sheath comprising a polymer film and shaped to define an elongated receptacle having a tubular wall extending from an enclosed end to an open end;
 wherein the elongated receptacle includes an interior volume configured to receive a socket tool having a lug opening, the lug opening disposed at the enclosed end of the elongated receptacle;
 wherein the elongated receptacle includes an exterior surface at the enclosed end configured to interface with a lug nut; and
 wherein the tubular wall is flexible and configured to conform into the lug opening to be disposed between the lug nut and the socket tool contained in the interior volume.

2. The drive socket protector of claim 1, wherein with a lug nut conforming the flexible sheath into the lug opening, the tubular wall is configured to wrap around a distal edge of the socket tool and extend proximally along an exterior surface of the socket tool.

3. The drive socket protector of claim 1, wherein the interior volume has a length dimension and a diameter dimension, the length dimension defined between the enclosed end and the open end and configured to protect the lug nut and a lug hole of the wheel.

4. The drive socket protector of claim 3, wherein the diameter dimension corresponds to a diameter of the socket tool.

5. The drive socket protector of claim 1, wherein the polymer film comprises a thickness less than 0.1 mm.

6. The drive socket protector of claim 1, further comprising a drawstring configured to conform the open end to the socket tool.

7. The drive socket protector of claim 6, wherein the drawstring is a cord-like element substantially disposed at the tubular wall and configured to compass an outer ring of the elongated receptacle.

8. The drive socket protector of claim 1, wherein the exterior surface at the enclosed end is further configured to be removably attached to an open end of a second drive socket protector and provide a tear point for removing the second drive socket protector.

9. The drive socket protector of claim 8, wherein the tear point comprises a serrated edge.

10. The drive socket protector of claim 1, wherein the socket tool comprises a ratchet and a socket, the socket providing the lug opening and the ratchet configured to rotate the socket.

11. The drive socket protector of claim 1, wherein the socket tool comprises an impact wrench, the impact wrench providing the lug opening.

12. The drive socket protector of claim 1, wherein the socket tool comprises a lug nut key, the lug nut key providing the lug opening.

13. A method for using a drive socket protector with a lug nut of a wheel, the method comprising:
 inserting a socket tool having a lug opening through an open end of a drive socket protector, the open end defined by a rim of a tubular wall spanning between the open end and an enclosed end formed by a meeting of the tubular wall, the tubular wall further defining an interior volume, such that the lug opening is disposed in the interior volume at the enclosed end and configured to engage an interior surface of the tubular wall at the enclosed end;

tightening a drawstring disposed at the tubular wall so as to substantially conform the interior surface of the tubular wall to the socket tool;

engaging a lug nut with an exterior surface of the enclosed end such that the interior surface of the tubular wall substantially conforms to an interior surface of the lug opening, the lug nut disposed at a wheel;

extending the tubular wall proximally along an exterior surface of the socket tool so as to provide a barrier between the socket tool and a lug hole of the wheel; and applying a rotational force at the socket tool so as to tighten or loosen the lug nut at a wheel.

14. The method of claim 13, wherein the drawstring is a cord-like element substantially disposed at the tubular wall and configured to compass an outer ring of the elongated receptacle.

15. The method of claim 13, further comprising the step of engaging a torque-applying tool at the socket tool and within the interior volume, such that the torque-applying tool and socket tool are substantially retained at the interior volume, the socket tool comprising a lug nut key.

16. The method of claim 13, wherein with the lug nut conforming the drive socket protector into the lug opening, the tubular wall is configured to wrap around a distal edge of the socket tool and extend proximally along an exterior surface of the socket tool.

17. A drive socket protector for wheels and lug nuts comprising:

a flexible sheath shaped to define an elongated receptacle having a tubular wall extending from an enclosed end to an open end;

wherein the elongated receptacle includes an interior volume configured to receive a socket tool having a lug opening, the lug opening disposed at the enclosed end of the elongated receptacle;

wherein the elongated receptacle includes an exterior surface at the enclosed end configured to interface with a lug nut;

wherein the tubular wall is flexible and configured to conform into the lug opening to be disposed between the lug nut and the socket tool contained in the interior volume; and wherein the exterior surface at the enclosed end is further configured to be removably attached to an open end of a second drive socket protector and provide a tear point for removing the second drive socket protector.

18. The drive socket protector of claim 17, wherein the tear point comprises a serrated edge.

19. The drive socket protector of claim 17, wherein with a lug nut conforming the flexible sheath into the lug opening, the tubular wall is configured to wrap around a distal edge of the socket tool and extend proximally along an exterior surface of the socket tool.

20. The drive socket protector of claim 17, wherein the interior volume has a length dimension and a diameter dimension, the length dimension defined between the enclosed end and the open end and configured to protect the lug nut and a lug hole of the wheel.

* * * * *